INVENTOR.
JOSEPH J. BAUMOEL
BY Lester H. Clark
ATTORNEY

United States Patent Office 3,074,273
Patented Jan. 22, 1963

3,074,273
CAPACITANCE MEASURING APPARATUS
AND METHOD
Joseph J. Baumoel, Sunnyside, N.Y., assignor to The Liquidometer Corporation, Long Island City, N.Y., a corporation of Delaware
Filed July 17, 1959, Ser. No. 827,952
1 Claim. (Cl. 73—304)

The present invention relates to capacitance measuring apparatus, and particularly to apparatus for measuring the volume of a liquid in a tank or other enclosure, which liquid has a dielectric constant different from that of an overlying gas, usually air.

Liquid level measuring apparatus is well known, in which the volume of liquid enclosed within a tank is determined by measuring the capacitance between two electrically conductive members which extend throughout the vertical length of the tank. That capacitance is commonly measured by balanceable network, usually a capacitance bridge circuit. The network is supplied with alternating current, and there is produced at the output terminals of the network a signal which is, ideally speaking, either in phase or 180° out of phase with the alternating current supply, depending upon the direction of unbalance of the network. This network output signal is supplied to an amplifier, whose output is in turn connected to one winding of a two phase motor, termed the variable phase winding. The other, or fixed phase winding of the two phase motor is supplied from the alternating current source through a circuit having a reactive impedance such that the current supplied to the fixed phase winding is shifted 90° with respect to the variable phase. In accordance with the characteristics of such motors, an output torque is produced only when the respective windings are supplied with currents having components which are 90° apart in phase. Consequently, when the network is balanced and no output signal is supplied through the amplifier to the variable phase winding, the motor remains stationary. When the network is unbalanced, the variable phase winding of the motor receives a current which is either 90° leading or 90° lagging with respect to the current in the fixed phase winding. The motor thereupon rotates in one direction or the other, depending upon the sense of unbalance of the network. The motor is utilized to drive the slider of a rebalancing potentiometer connected in the balanceable network in a direction to restore the condition of balance and reduce the amplifier input signal to zero. The motor also drives an indicator pointer over a scale which is calibrated to indicate the volume of liquid in the tank. Alternatively, the motor may drive recording or control apparatus.

Liquid level measuring systems such as that just described work very satisfactorily in measuring the level of liquids which are good electrical insulators. However, when required to measure the level of liquids having substantial electrical conductivity, erroneous results may be produced because of the conductivity of the liquid. More specifically, the conductivity introduces into the output of the network a signal which lags the capacitive unbalance output signal by an angle which, assuming proper loading of the network, is substantially 90°. As long as the network is balanced, this signal can have no effect, since it has no effective component in quadrature to the current in the fixed phase of the motor, and hence has no torque-producing component and cannot cause improper operation of the motor. However, during unbalance of the network, this resistive signal has no torque-producing component only so long as it remains in phase or 180° out of phase with the current in the fixed phase of the motor. The phase relationships described above between the windings of the motor represent ideal conditions which in practice are subject to substantial modification. In any commercial device, the current of the fixed phase is not separated exactly 90° from the current of the variable phase. Furthermore, where the bridge unbalance is large, the amplifier may approach saturation, thereby heavily loading the bridge. Either the amplifier saturation, or the bridge loading, or both, may introduce a phase deviation between amplifier input and output.

Consider the case where there is a substantial resistive unbalance of the bridge, and a capacitive unbalance in a direction such that the capacitive unbalance signal current applied to the variable phase winding lags the current supply to the fixed phase winding. This lag is nominally 90°. The resistive unbalance signal current lags the capacitive unbalance signal current by a further 90°, assuming proper bridge loading, and is therefore 180° behind the fixed phase. The further lag introduced by the phase shift in the amplifier may have the effect that the resistive signal, as it appears at the motor winding, is more than 180° lagging behind the fixed phase winding current, and consequently appears to lead the fixed phase current. Under such conditions, the torque produced in the motor by the resistive unbalance signal may oppose the torque produced by the capacitive unbalance signal and may become larger than the capacitive unbalance signal torque. If that happens, then the motor may start running in the wrong direction to rebalance the network, and may then run away, resulting in continuous rotation of the indicator in one direction or it may drive the indicator to one end of its scale if the range of indicator movement is limited.

Capacitance liquid level measuring apparatus has been widely used on aircraft, because of its light weight. While it has been satisfactory to measure fuel, it has not been successful with lubricating oil, because of substantial conductivity which is encountered in many oils. These oils are required to be measured under temperature conditions which vary over a range from below zero to well over 350° F. It has been found that some of the oils required to be measured have conductivity components which vary from substantially zero at the low end of the temperature range to a very high conductivity at the high end of the temperature range. It has been found impossible to measure these oils with capacitance measuring apparatus of the prior art, because of the runaway condition described above.

It is an object of the present invention to provide an improved capacitance responsive measuring apparatus and method, which minimizes the effect of resistance components in the quantity or condition being measured.

Another object is to provide an improved liquid level control measuring apparatus and method which can accurately measure liquids having purely capacitive electrical characteristics as well as liquids having both the capacitive and resistive electrical characteristics.

Another object of the invention is to provide an improved two phase motor control system and method in which the operation of the motor is not overly sensitive to variations in phase of the signal applied to the variable phase winding of the motor.

The foregoing and other objects of the invention are attained in the apparatus described herein.

The difficulties described above, which are caused by a substantial conductivity of the liquid being measured, may be avoided, in accordance with the present invention, by introducing a corrective phase shift between the fixed phase winding of the motor and the variable phase winding of the motor. As mentioned above, the conventional phase separations in such a motor are to have the variable phase winding current 90° leading the fixed phase winding current for one direction of rotation and 90° lagging the fixed phase winding current for the other direction of rotation. In accordance with the present invention, a correction for an expected maximum undesired phase shift of $x°$ is introduced by providing unconventional phase separations in the motor so that the variable phase winding is energized with current in the neighborhood of $(90°-x°)$ lagging the fixed phase winding current for one direction of energization and in the neighborhood of $(90°+x°)$ leading the variable phase winding current for the opposite direction of rotation. If such a corrective phase shift is introduced, then the motor still runs in the proper direction to rebalance the network in response to a purely capacitive unbalance of the bridge circuit. Furthermore, even though a substantial phase shift may be introduced in the bridge or amplifier by a resistive unbalance, it cannot reverse the direction of the motor, and the network is rebalanced as well in this case as when the unbalance is purely capacitive.

Other objects and advantages of the invention will become apparent from a consideration of the following specification and claim, taken together with the accompanying drawings.

Figure 1:
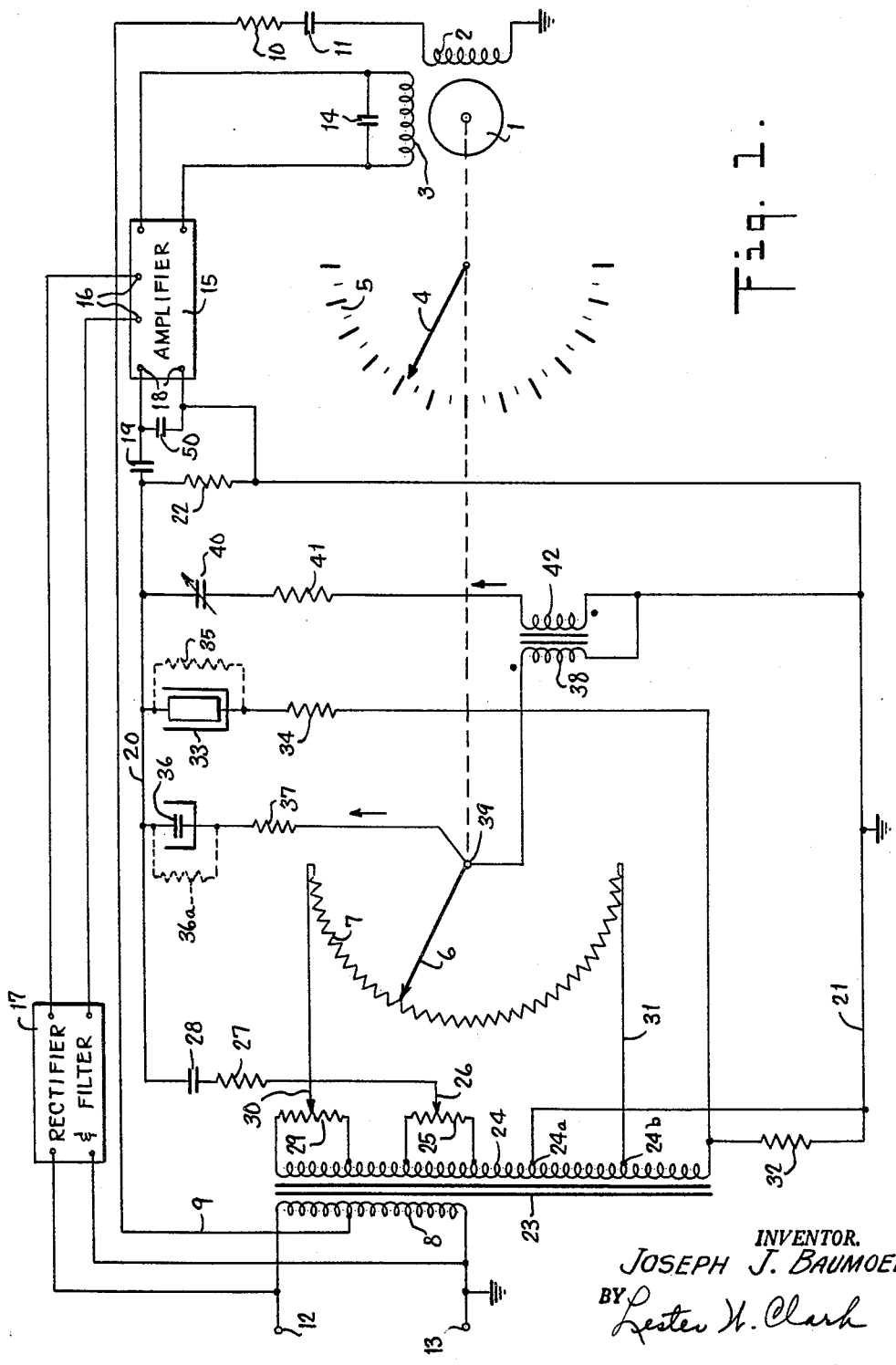
FIG. 1 is a wiring diagram of a liquid level measuring system embodying the invention.

Referring to FIG. 1, there is shown a motor 1 of the two phase type, having a fixed phase winding 2 and a variable phase winding 3. The motor 1 drives a pointer 4 over a scale 5 and also drives a slider 6 along a slidewire resistor 7. Slider 6 and resistor 7 are hereinafter referred to as a rebalancing impedance. The winding 2 is supplied with alternating current from a circuit which may be traced from a tap on a transformer primary winding 8 though a wire 9, a resistor 10, a capacitor 11 and winding 2 to ground. The lower end of winding 8, as it appears in the drawing, is also grounded. The terminals of winding 8 are connected to any suitable source of alternating current at terminals 12 and 13.

The variable phase winding 3 is provided with a parallel capacitor 14 and is connected to the output terminals of an amplifier 15. The capacitor 14 is provided to reduce the reactive current supplied by the output of the amplifier 15 below that which would be supplied to the winding 3 alone. The amplifier 15 has power input terminals 16 supplied with direct current from a rectifier and filter 17 whose input terminals are connected to the alternating current supply terminals 12 and 13. The amplifier 15 has signal input terminals 18 connected through a coupling capacitor 19 to the output terminals of a balanceable network. As shown in the drawing, the wire 20 constitutes one output terminal of the network and the grounded wire 21 constitutes the other output terminal. A resistor 22, which may be approximately 1 megohm, is connected between the wires 20 and 21 to discharge any unidirectional potential which may appear on the coupling capacitor 19.

A capacitor 50 is connected across the input terminals 18 of the amplifier. The capacitor 50 acts, in parallel with the input impedance of the amplifier, as a load for the balanceable network. The capacitor 50 is selected to have a low impedance as compared to the effective impedance of the network. As long as this relationship is maintained between the overall network impedance and the impedance of the load on the network, the 90° phase relationship between the network output signals due respectively to resistive and capacitive unbalance will also be maintained, within a practical approximation.

Alternatively, a resistor of low impedance as compared to the overall network impedance might be used in place of capacitor 50.

The primary winding 8 is part of a transformer 23 having a secondary winding 24 which supplies current to the network. A tap 24a on the secondary winding 24 is connected to the grounded output terminal 21. A slidewire resistor 25 is connected across an intermediate section of the secondary winding 24 and has a slider 26 connected through a resistor 27 and a capacitor 28 to the bridge output terminal 20. Another slide wire resistor 29 is connected across a section of the winding 24 at the upper end thereof as it appears in the drawing, and has a slider 30 connected to the upper end of the rebalancing resistor 7. The lower end of the resistor 7 is connected through a wire 31 to a tap 24b on the secondary winding 24. A temperature compensating resistor 32 is connected between the lower terminal of the secondary winding 24 and the grounded output terminal 21. The measuring arm of the bridge is connected between output terminal 20 and the lower terminal of secondary winding 24 and includes in series the main measuring capacitor 33 and a resistor 34. The main measuring capacitor includes a probe located within and insulated from the walls of the tank which contains the liquid to be measured. A resistor 35 is shown in dotted lines in parallel with the capacitor 33, to indicate that there may be a substantial leakage conductance path in parallel with the capacitor 33.

Another arm of the bridge includes a dielectric constant compensating capacitor 36 and a resistor 37 connected between the output terminal 20 and the common junction of slider 6 and one terminal of a transformer winding 38. The other terminal of winding 38 is connected to the grounded output terminal 21.

A variable capacitor 40 and a resistor 41 are connected in series with a transformer winding 42 coupled to winding 38, between the output terminal 20 and the grounded output terminal 21.

The slider 30 is adjustable to calibrate the network so that when the tank is full the slider 6 is near the top end of the resistor 7 and the pointer 4 indicates a full tank. The slider 26 is adjustable to compensate the network so that when the tank is empty, the network balances with the slider 6 near the lower end of the resistor 7 and the pointer 4 at the lower end of the scale. The windings 38 and 42 are in opposite phase relation as indicated by the dots adjacent the windings on the drawing. The variable capacitor 40 is adjustable so that when the tank is empty, the curent flow through winding 42 and capacitor 40 just balances the flow through winding 38 and empty capacitor 36, so that the capacitor 36 in this condition has no effect on the balanced condition of the bridge.

The capacitance appearing at the measuring capacitor 33 is balanced in the bridge circuit by the capacitance of the fixed capacitor 28 and the compensating capacitor 36. When the bridge becomes unbalanced by a change in capacitance due to a change in level at the capacitor 33, a signal appears at the output terminals 20 and 21. The phase of this signal is either the same or the opposite to that of the transformer winding 24, within the approximation noted in the discussion regarding capacitor 50, and is fed to the amplifier 15 and through it to the winding 3, where it causes rotation of the motor in a direction to move the slider 6 along the resistor 7 so as to change the potential applied across capacitor 36. This change continues until the bridge is rebalanced, at which time the output terminal 20 is at ground potential, and no signal is supplied to the amplifier, whereupon the motor stops.

The operation of the circuit as just briefly described above is entirely conventional.

The only structural element appearing in FIG. 1 which is not present in the circuits of the prior art is the resistor 10. This resistor introduces a corrective shift into the phase relationship of the current in the fixed phase winding 2 as compared to the current in the winding 3, as more fully described below. The use of the resistor 10 for this purpose is the most expedient method of carrying out the present invention. Other expedients are known which will produce the same effect. For example, a phase shifting bridge may be used instead of a simple resistor. Alos, instead of introducing a lag in phase of the fixed phase winding current, equivalent expedients could be employed to introduce a lead in phase of the variable phase winding current.

Figure 2:
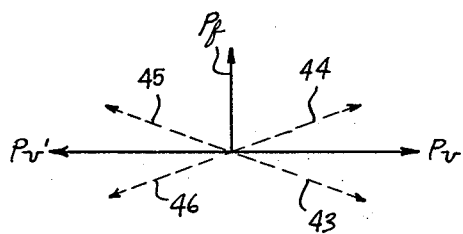
FIGS. 2 and 3 are vector diagrams illustrating the operation of prior art apparatus.
Figure 3:
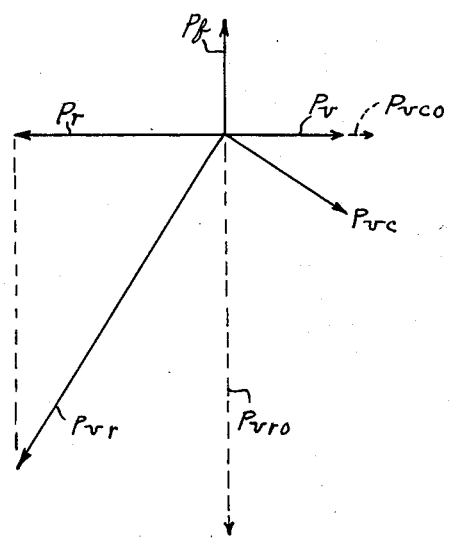

FIGURES 2 and 3

The difference in operation of a conventional circuit from the circuit constructed in accordance with the present invention is brought out in the following discussion. FIGS. 2 and 3 are vector diagrams illustrating the operation of a prior art circuit.

Referring to FIG. 2, there is shown a vertically extending vector $P_f$ which represents the alternating current flowing through the fixed phase winding of a two phase motor in a conventional capacitance bridge measuring system. The two horizontal vectors $P_v$ and $P_{v'}$ illustrate the currents which may flow in the variable phase winding of the motor under conditions of network unbalance, the vector $P_v$ corresponding to unbalance in one sense and the vector $P_{v'}$ corresponding to unbalance in the opposite sense. In accordance with the characteristics of two phase motors, torque is produced when the windings are supplied with currents 90° out of phase, or which have components 90° out of phase. The motor will run in one direction when the current supplied to the variable phase has the phase relationship represented by the vector $P_v$ and it will run in the opposite direction when the current supplied to the variable phase has the phase relationship represented by the vector $P_{v'}$.

The 90° relationship between the fixed phase vector $P_f$ and the variable phase vectors $P_v$ and $P_{v'}$ represents ideal conditions. Actually, because of various practical expedients, the ideal relationship is not usually attained in practical apparatus. The actual phase relationships may, for example, be 20° leading or lagging from the ideal phase relationships, as indicated by the dotted line vectors 43, 44, 45 and 46 in FIG. 2.

The vector diagram in FIG. 2 is made with the assumption that the network is subjected to capacitive unbalance only and that there is no component in the network output representing a resistive unbalance.

FIGURE 3

This diagram illustrates the conditions which may exist in a prior art circuit when there is a substantial resistive unbalance as well as a substantial capacitive unbalance. The fixed phase current is again represented by the vector $P_f$. FIG. 3 is drawn for one direction of unbalance of the bridge only in order to simplify the diagram. The unbalance signal at the amplifier output is considered as consisting of a capacitive unbalance component $P_{vco}$ and a resistive unbalance component $P_{vro}$. If these two components could be handled by the amplifier without a phase shift variation, then no difficulty would be encountered at the motor. The $P_{vro}$ component would produce no torque and the $P_{vco}$ component would react with the fixed phase component $P_f$ to produce torque in the proper direction to rebalance the bridge.

However, the resistive component $P_{vro}$, as it appears in FIG. 3, represents an idealized condition since it does not reflect phase shift variations in the amplifier. Since this component is due to the conductivity of the oil, and since it commonly predominates over the component due to the capacitance of the oil, it may have a substantial magnitude considerably greater than the capacitive component of the bridge output signal, as illustrated. This resistive component of the signal tends to saturate the amplifier. Most amplifiers have a characteristic such that when supplied with signals to the point of saturation of the tubes, transistors, or other translating devices, a phase shift deviation appears between the amplifier input and its output, which is substantially different from the phase shift in the amplifier when it is unsaturated. In FIG. 3, a phase lag, characteristically associated with the circuit of FIG. 1 (in other circuits a lead may be encountered instead of a lag), is illustrated by the shift from the amplifier output signal $P_{vco}$ to the amplifier output signal $P_{vc}$ and from the amplifier output signal $P_{vro}$ to the amplifier output signal $P_{vr}$. Both the capacitive unbalance signal $P_{vc}$ and the resistor unbalance signal $P_{vr}$ now have components which extend horizontally in the drawing and which therefore react with the fixed phase current $P_f$ to produce torque. The horizontal component of the capacitive signal is shown at $P_v$ and reacts with the fixed phase current $P_f$ to produce torque in one direction, which is the correct direction to rebalance the bridge. However, the resistive component $P_r$ reacts with the fixed phase current $P_f$ to produce a torque in the opposite direction. Since the $P_r$ signal is larger than the $P_v$ signal, the $P_r$ torque dominates and the motor runs in the direction to further unbalance the bridge. This action results in an unstable system, so that the motor continues to run in the unbalancing direction until it is stopped by the slider or the pointer reaching the end of its travel. The measuring apparatus is therefore unable to make any measurement of the liquid in the tank.

Figure 4:
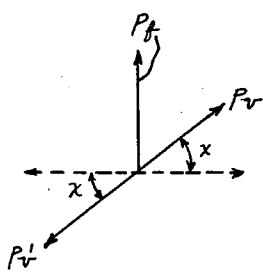
FIGS. 4 and 5 are vector diagrams ilustrating the operation of the apparatus of FIG. 1.
Figure 5:
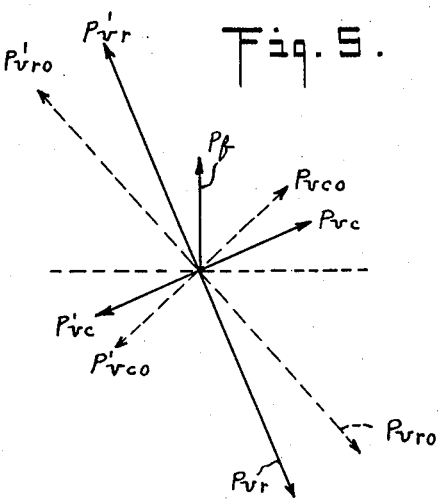

FIGURES 4 and 5

FIG. 4 illustrates operation of a capacitance measuring apparatus embodying the present invention, in which the fixed phase has a normal angle not exactly half-way between the two opposed variable phase angles, as in the prior art systems, but has a phase angle closer to the lagging phase of the variable phase. If the amplifier characteristic is such that a maximum phase lag of $x°$ is introduced thereby, then the variable phase current should be separated from the fixed phase current by $(90°-x°)$ when lagging, and by $(90°+x°)$ when leading. FIG. 4 illustrates the operation of such a system when it is subjected to capacitive unbalance only. The variable phase current $P_v$ or $P_{v'}$ may be resolved into a horizontal component which is effective to produce torque in the motor and a vertical component which is not so effective. In the case of lagging current $P_v$, the torque is in one direction and in the case of the leading current $P_{v'}$, the torque is in the opposite direction. The system therefore rebalances properly.

FIG. 5 illustrates the operation of the circuit in accordance with the present invention when the bridge is subjected to a large resistive unbalance.

It is assumed that the bridge output has a capacitive component which, when referred to the datum employed at the motor, may be represented by the vector $P_{vco}$ and a corresponding resistive component $P_{vro}$. Due to the phase shift through the amplifier, the capacitive component appears at the variable phase winding as vector $P_{vc}$ and the resistive component appears as the vector $P_{vr}$. The horizontal components of both of these vectors, which react with the fixed phase current $P_f$ to produce a torque, are both directed to the right from the origin of vectors and hence both act to produce torque in the same direction, which is the proper direction to effect capacitive rebalance of the bridge.

The conditions for rotation in the opposite direction are represented by the vectors $P'_{vco}$, $P'_{vc}$, $P'_{vro}$ and $P'_{vr}$. Note that these vectors also have torque producing components which are all in the proper direction to produce rebalance of the bridge.

Thus, by simply introducing a shift in phase between the fixed and variable phase windings of the motor, in the proper sense, there is produced in accordance with the present invention a capacitance measuring circuit which is not adversely affected by resistive shunting of the capacitance components being measured.

Most amplifiers have a very definite maximum phase shift which is introduced upon saturation. This maximum value may, for example, range from 25° to 45° for some amplifiers. Corrective phase shifts may readily be introduced in accordance with the present invention to prevent adverse effects due to amplifier phase shifts within the range indicated. Since the corrective phase shift reduces the sensitivity of the circuit, an amplifier of higher gain may be required to correct the sensitivity. In addition, scale errors may be produced if a resistive signal is present when the capacitive signal is balanced. For these reasons, it is desirable not to introduce a corrective phase shift greater than a necessary minimum.

The present invention cannot, of course, be used to correct phase shifts of more than 90°, and is not practical where the phase shift to be corrected approaches 90°. There is no limit, however, other than the 90° limit, to the amount of phase shift which can be corrected by the use of this invention.

While I have shown and described a preferred embodiment of my invention, other modifications thereof will readily occur to those skilled in the art, and I therefore intend my invention to be limited only by the appended claim.

I claim:

Apparatus for measuring the level in a tank of a liquid having a dielectric constant different from that of an overlying gas and subject to electrical resistance variations unrelated to changes in liquid level, comprising:

(a) a level sensing capacitor including two electrically conductive members extending vertically in contact with the liquid in the tank and insulated from each other;

(b) a balanceable electrical network having output terminals and including said capacitor and variable impedance means;

(c) an amplifier including input terminals and output terminals, and having a characteristic maximum phase shift at saturation of substantially less than 90° between its input and output terminals;

(d) means connecting the network output terminals to the amplifier input terminals;

(e) a two phase motor having a rotor, a fixed phase winding and a variable phase winding;

(f) means connecting the amplifier output to the variable phase winding;

(g) means connecting the motor rotor to the variable impedance means for rebalancing the network in response to unbalance thereof, (h) alternating current supply means including:
(1) first connections for supplying alternating current to said fixed phase winding;
(2) second connections for supplying alternating current to said network; and
(3) means for establishing the current supplied to the network at a fixed phase difference from the fixed phase winding current, said difference being equal to the algebraic sum of 90° and the maximum phase shift of the amplifier;

(i) said network being effective to produce at its output terminals a signal component in phase with the current supplied to the network and leading said fixed phase current upon capacitive unbalance of the network in one sense and a signal component of opposite phase to the current supplied to the network and lagging the fixed phase current upon capacitive unbalance of the network in the opposite sense, said network also being effective upon resistive unbalance in either sense to produce at its output terminals a signal component lagging the corresponding capacitive unbalance signal component by 90°, (j) said network and said amplifier cooperating to supply to the variable phase winding, in response to a capacitive component of unbalance in said one sense, a current which leads the fixed phase current by 90° plus said maximum phase shift, whereby any current supplied to the variable phase winding due to a resistive unbalance component also leads said fixed phase current, whether or not there is any phase shift in the amplifier;

(k) said network and said amplifier also cooperating to supply to the variable phase winding, in response to a capacitive component of unbalance in said other sense, a current which lags the fixed phase current by 90° minus said maximum phase shift, whereby any current supplied to the variable phase winding due to resistive unbalance also lags the fixed phase current, whether or not there is any phase shift in the amplifier;

(l) whereby the direction of motor rotation is determined by the sense of capacitive unbalance only and is not affected by resistive unbalance nor by any phase shift in the amplifier.

References Cited in the file of this patent
UNITED STATES PATENTS

| | | |
|---|---|---|
| 2,714,695 | Schaelchlin | Aug. 2, 1955 |
| 2,867,120 | Schafer | Jan. 6, 1959 |
| 2,918,818 | Meyer | Dec. 29, 1959 |